US006940999B2

(12) United States Patent
Lin

(10) Patent No.: US 6,940,999 B2
(45) Date of Patent: Sep. 6, 2005

(54) METHOD FOR TARGET DETECTION AND IDENTIFICATION BY USING PROXIMITY PIXEL INFORMATION

(75) Inventor: Ching-Fang Lin, Simi Valley, CA (US)

(73) Assignee: American GNC Corp., Simi Valley, CA (US)

( * ) Notice: Subject to any disclaimer, the term of this patent is extended or adjusted under 35 U.S.C. 154(b) by 785 days.

(21) Appl. No.: 09/881,272

(22) Filed: Jun. 13, 2001

(65) Prior Publication Data

US 2002/0012451 A1 Jan. 31, 2002

Related U.S. Application Data

(60) Provisional application No. 60/211,343, filed on Jun. 13, 2000.

(51) Int. Cl.[7] ............ G06K 9/00

(52) U.S. Cl. ............ 382/103; 250/334; 250/347; 348/29; 348/133; 348/145; 348/152; 348/161; 382/159; 382/190; 382/209; 382/224; 382/248; 382/251

(58) Field of Search ............ 250/330, 334, 250/347, 348; 348/29, 133, 145, 152, 161; 382/103, 159, 190, 191, 197, 209, 224–225, 248, 253, 260, 284, 294

(56) References Cited

U.S. PATENT DOCUMENTS

| | | | | | |
|---|---|---|---|---|---|
| 6,008,492 | A | * | 12/1999 | Slater et al. | 250/334 |
| 6,075,891 | A | * | 6/2000 | Burman | 382/191 |
| 6,282,301 | B1 | * | 8/2001 | Haskett | 382/103 |
| 6,353,673 | B1 | * | 3/2002 | Shnitser et al. | 382/103 |
| 6,665,438 | B1 | * | 12/2003 | Lin | 382/191 |
| 6,678,395 | B2 | * | 1/2004 | Yonover et al. | 382/103 |
| 6,694,064 | B1 | * | 2/2004 | Benkelman | 382/284 |
| 6,724,940 | B1 | * | 4/2004 | Qian et al. | 382/253 |
| 6,741,744 | B1 | * | 5/2004 | Hsu | 382/229 |
| 6,750,964 | B2 | * | 6/2004 | Levenson et al. | 356/326 |
| 6,778,702 | B1 | * | 8/2004 | Sweet | 382/191 |
| 6,792,136 | B1 | * | 9/2004 | Niesen | 382/118 |

* cited by examiner

*Primary Examiner*—Bhavesh M. Mehta
*Assistant Examiner*—Gregory Desire
(74) *Attorney, Agent, or Firm*—Raymond Y. Chan; David and Raymond

(57) ABSTRACT

An efficient approach to exploit hyperspectral imagery and detect target of interest is disclosed. This approach uses proximity pixels as reference signatures to detect potential discontinuity that represents material of unknown existing on the terrain. By incorporating signature of a chosen material of interest, this approach provides an effective way for target detection and identification. An evolutionary algorithm is employed to estimate the abundance of material of interest.

15 Claims, 6 Drawing Sheets

METHOD FOR TARGET DETECTION AND IDENTIFICATION BY USING PROXIMITY PIXEL INFORMATION

CROSS REFERENCE OF RELATED APPLICATION

This is a regular application of a provisional application, application No. 60/211,343, filed Jun. 13, 2000.

FIELD OF THE PRESENT INVENTION

The present invention relates to remote sensing imagery processing, and more particularly to a method for target detection and identification with hyperspectral image, wherein the information extracted from the proximity pixels is used to aid the target detection and identification.

DESCRIPTION OF RELATED ARTS

The unifying trait of all hyperspectral data is the existence of a gross quantity of specific and minuscule spectral bands located within the optical wavelength region. The exact quantity of bands relating to any hyperspectral image varies widely. A single band range located within the visible wavelength region might vary between a single nanometer to hundreds of nanometers. Band ranges located within the infrared and thermal wavelength regions might exceed those for the visible wavelength region. Of course, hyperspectral data is exceedingly desirable, due to the ease with which one may recognize observed entities based on very specific characteristic features, corresponding to those entities, which are associated with very narrow spectral bands. This type of detection and recognition is simply not possible by using traditional methods.

The disadvantage associated with hyperspectral data is the necessary capability to process extraordinary amounts of information. Specific elements, entities or objects, or components thereof, possess specific spectral signatures. One's ability to ascertain a specific spectral signature results in one's ability to ascertain the corresponding element. Previous methods for dealing with hyperspectral data included pattern matching techniques. These techniques rely upon models and least squares algorithms in order to recognize and isolate elements within hyperspectral data. These pattern matching techniques are limited by their lack of robustness. Their results degrade significantly across spatial and temporal variations. They are inadequate at recognizing elemental components from a combined spectral signature. They require a tremendous amount of computation. Their results degrade significantly across sensor and atmospheric variations. They do not deal with nonlinearity well. Also, these techniques do not respond well to increasing databases of elements for which to detect within the hyperspectral data.

It is also noted that the image data represent a very complex set of materials that are not easily classified without accurate ground truth data. The traditional method for target detection and identification with hyperspectral image data set is to use a large number of material signatures as references. The disadvantage of this method is huge computational load and low accuracy.

SUMMARY OF THE PRESENT INVENTION

A main object of the present invention is to provide an efficient proximity-based approach to perform fast and accurate pixel unmixing for target detection and identification.

A further object of the present invention is to provide an efficient proximity-based approach to perform fast and accurate pixel unmixing for target detection and identification by using evolutionary algorithm.

Another object of the present invention is to provide an efficient proximity-based approach to perform fast and accurate pixel unmixing for target detection and identification by using evolutionary algorithm and using the neighboring pixel signatures as references.

DETAILED DESCRIPTION OF THE PREFERRED EMBODIMENT

The present invention provides an efficient proximity-based approach to unmix spectral pixels for target detection and identification. This proximity-based approach uses the neighboring pixel signatures as references to detect material of interest which does not present in the neighboring pixels. By using the neighboring pixel signatures and the signature of material of interest as references there are only nine endmembers are involved. The computational load is dramatically reduced. The accuracy of target detection is also enhanced due to the introduction of the material information presented in the neighboring pixels.

The possible application of the proximity-based approach of the present invention for target detection assumes that the physical environment changes gradually over a small range of terrain (terrain covered by 3×3 pixels). In image science, it is commonly assumed that any pixel property is strongly dependent on the surrounding pixels. If this pixel is partitioned into sub-pixels, the properties of these sub-pixels are determined using a numerical interpolation scheme or by fitting a "true" surface to the set of properties of the surrounding pixels. Pixels further away from a given pixel are not expected to have a considerable contribution to the sub-pixels' properties obtained from a partition of this pixel. That is, subpixel properties of a given pixel can be considered independent of the properties of pixels far away.

A section from band 52 of the Jasper Ridge hyperspectral image is taken to graphically illustrate this effect. A piece of this band comprising a subset 3×3 pixel image, is selected to demonstrate the effect of neighboring pixels on the test pixel in a heterogeneous background.

Figure 1:
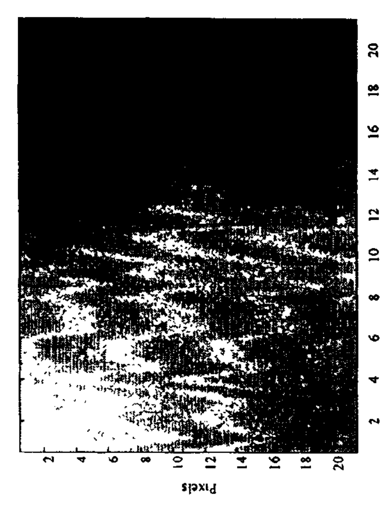
FIGS. 1(*a*) to 1(*d*) intuitively illustrate the concept of the proximity-based target detection and identification approach.
Figure 1:
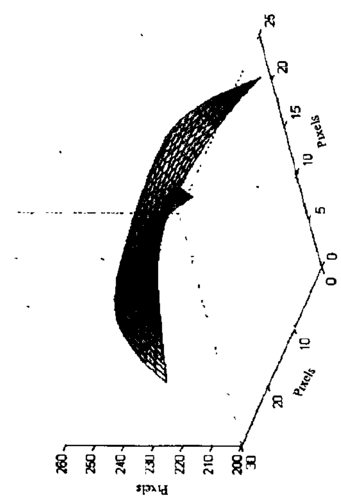
Figure 1:
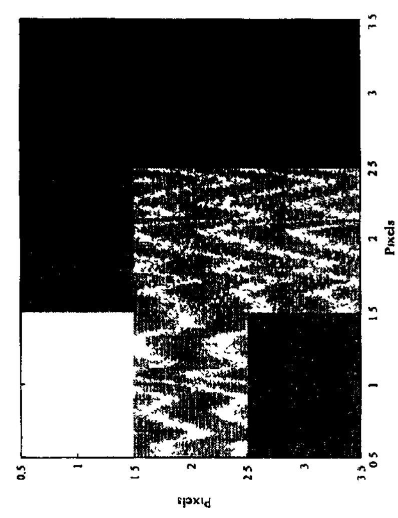
Figure 1:
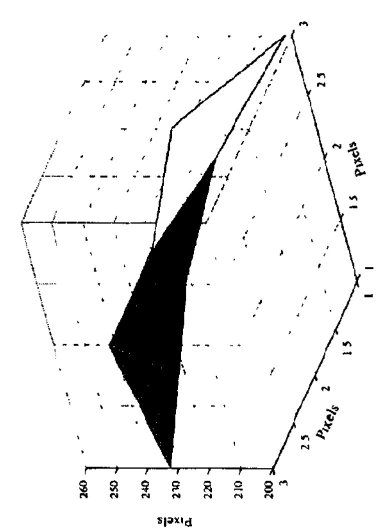

If this image represents a range of terrain, then it is expected that the discontinuities between consecutive pixels do not, in general, physically exist, but instead, are limitations due to the resolution of the image. FIG. 1(*b*) shows a 3-D image of the pixel gray values of the image displayed in FIG. 1(*a*). In an exact representation of the terrain, smoother variations are expected in the pixel gray values.

FIG. 1(*c*) shows the same terrain under the assumption that correlation among adjacent pixels exists. Under this assumption, the image in FIG. 1(*a*) was re-sampled (partitioned). Each pixel in FIG. 1(*a*) was divided into 49 sub-pixels. Under the assumption of correlation among neighboring pixels (often borne out in practice), then FIG. 1(*c*) is a more realistic representation of the terrain characterized by the image given in FIG. 1(*a*).

FIG. 1(*d*) shows a 3-D representation of the pixel gray values for the same image after a bi-cubic interpolation. Continuous changes in the pixel gray values are noticeable. This is a more realistic representation of terrain variations.

This example graphically illustrates the application of the present invention for target detection which is based on the rationale of neighboring pixel spectral signature similarities. If the image shows discontinuity between consecutive pixels, it is assumed that different materials present in some pixels.

Figure 2:
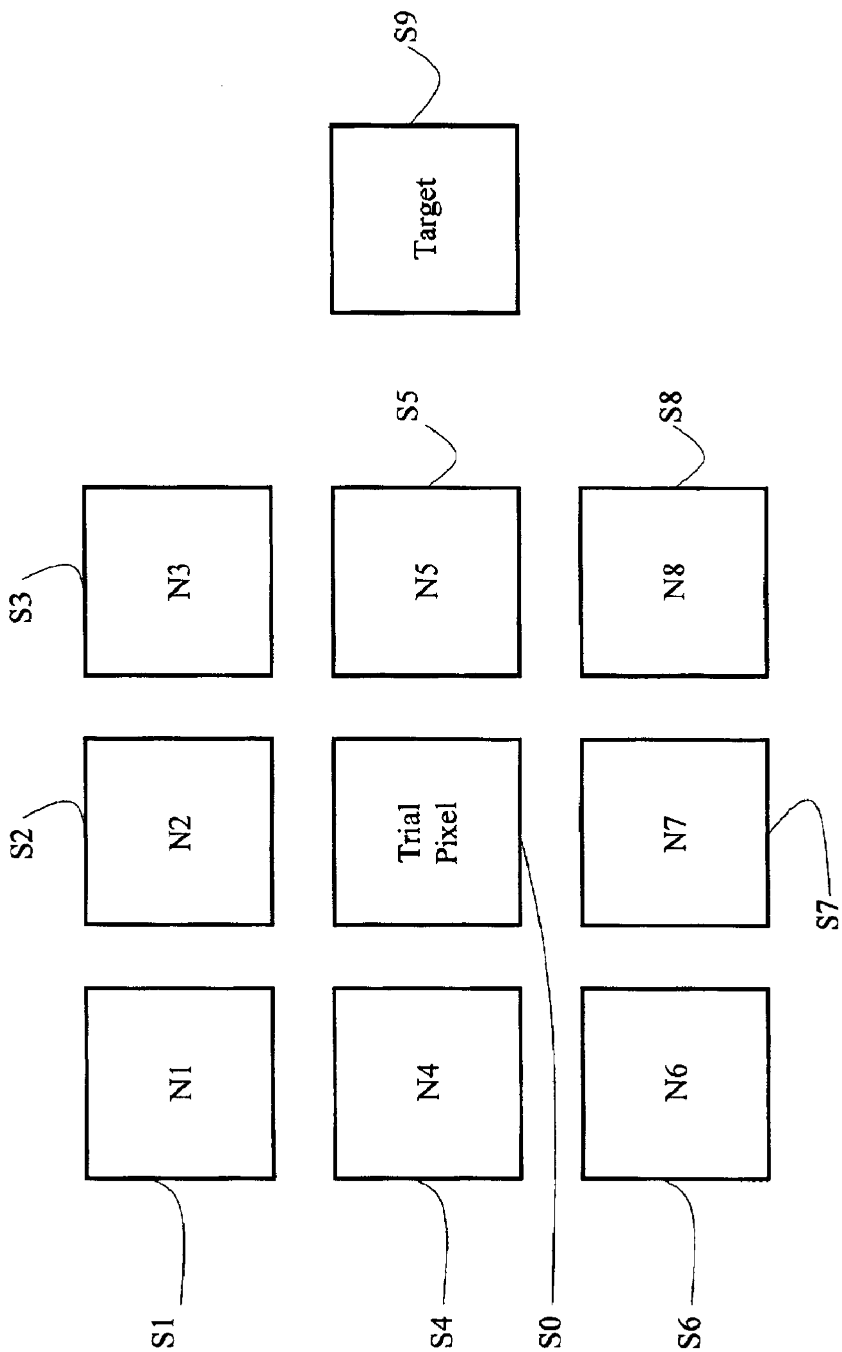
FIG. 2 shows the procedure of building a signature reference library by using neighboring pixels.

The proximity-based target detection approach of the present invention uses the signatures extracted from proximity pixels as the reference to find the inflection point which implies a new material occurring in this pixel, as shown in FIG. 2. Referring to FIG. 2, the signatures collected from the proximity pixels, i.e. N1, N2, N3, N4, N5, N6, N7, and N8, are used as reference signatures during pixel unmixing. The signature of the material of interest is another reference signature when this method is used to find this material of interest.

The proximity-based target detection approach comprises of the following steps:

(1) Read into the hyperspectral image data, wherein the hyperspectral image data is a hyperspectral cube, i.e. to receive the hyperspectral image cube which represents a scene in terms of wavelength and spatial position.

(2) Select the trial pixel, wherein the trial pixel can be presented by its location (x,y).

(3) Select target/material of interest from a target database, wherein the material of interest represents a target for target detection and identification.

(4) Build a reference spectra library, where endmembers of the spectra library are the signatures collected from the eight neighboring pixels and the signature of the material of interest.

(5) Apply an abundance estimator to unmix the trial pixel, wherein the abundance estimate of the material of interest implies the presence of the target.

Figure 3:
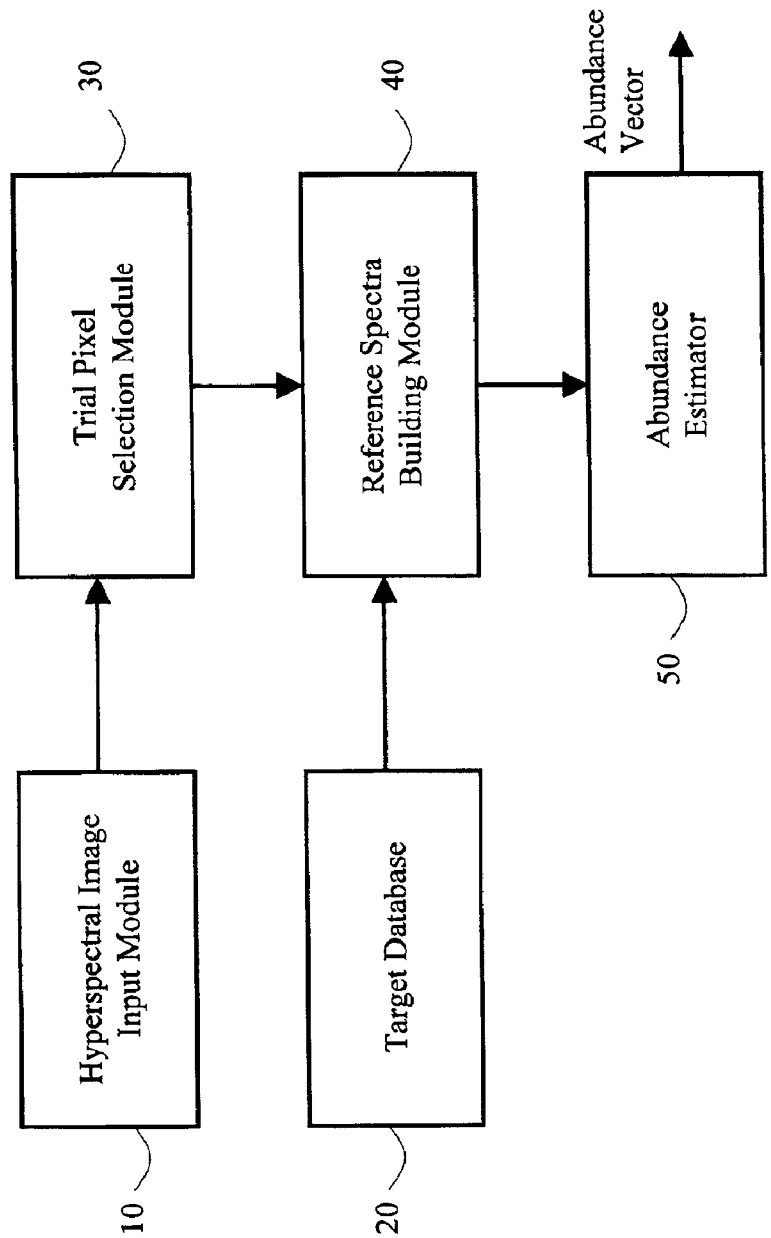
FIG. 3 is a block diagram illustrating the preferred implementation of the proximity-based target detection and identification approach according to the present invention.

Referring to FIG. 3, the proximity-based target detection approach comprises 5 functional elements, including a hyperspectral image input module 10, a trial pixel selection module 30, a target database 20, a reference spectra building module 40, and an abundance estimator 50.

The hyperspectral image input module 10 reads image data from the hyperspectral image cube which is a 3-dimensional data set. The horizontal location (x,y) presents two dimensions and the third dimension is the wavelength.

The trial pixel selection module 30 defines a trial pixel for analysis. The trial pixel is represented by its location, i.e. (x,y), which can be selected interactively if a graphic user interface (GUI) is available. It also can be selected by input the numbers of x and y.

The reference spectra building module 40 collects the signatures of the neighboring pixels around the trial pixel and the signature of the material of interest. The neighboring pixels are (x−1, y+1), (x, y+1), (x+1, y+1), (x−1, y), (x+1, y), (x, y−1) and (x+1, y−1).

The abundance estimator 50 performs the unmixing of the trail pixel by using the reference signatures from the reference spectra building module 40. The abundance estimator 50 can be a maximum likelihood estimator, a least square estimator, or an evolutionary algorithm.

Figure 4:
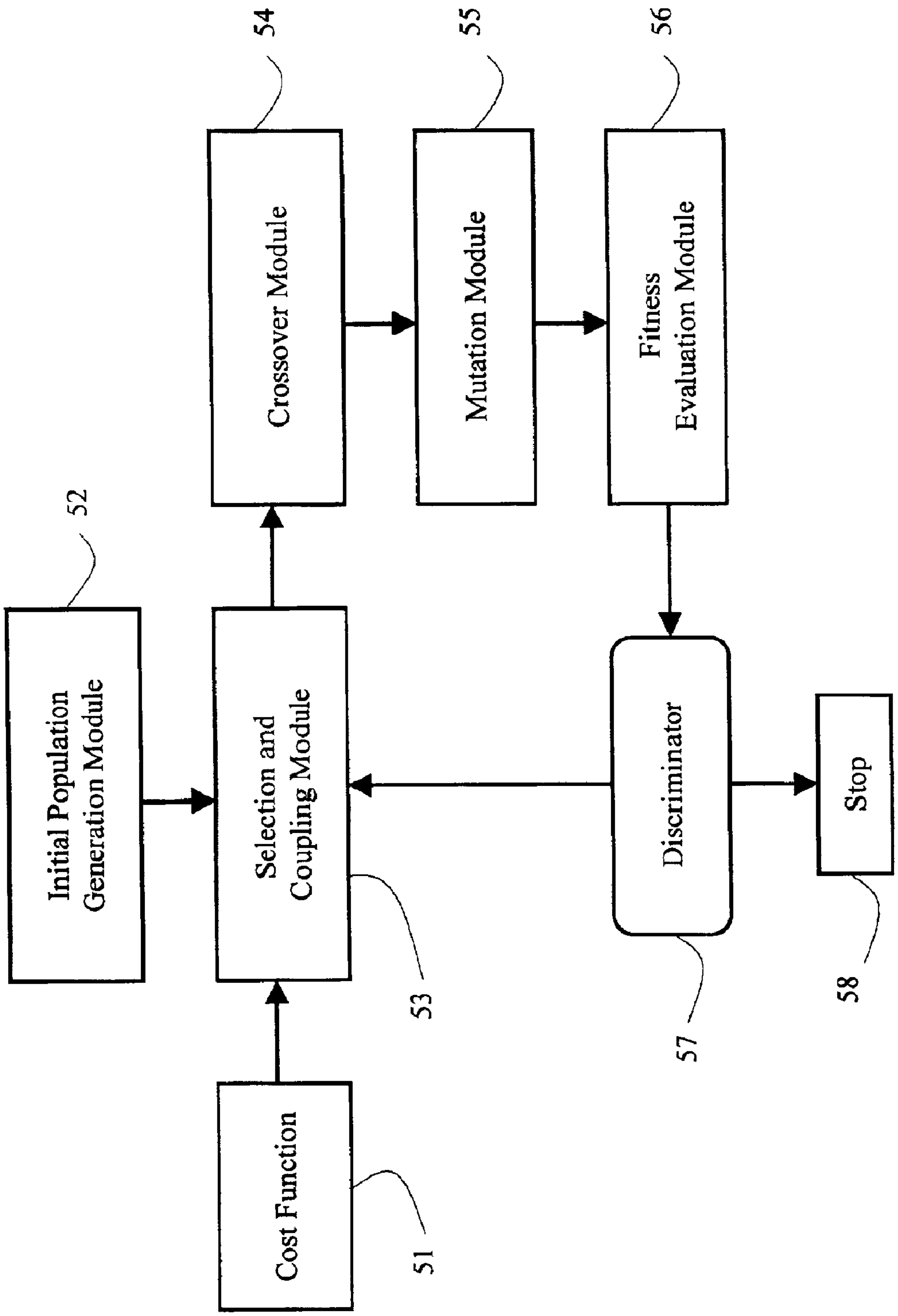
FIG. 4 is a block diagram illustrating the preferred implementation of the evolutionary algorithm used for hyperspectral pixel unmixing according to the present invention.

The preferred implementation of the evolutionary algorithm is shown in FIG. 4, which comprises a cost function module 51, an initial population generation module 52, a selection and coupling module 53, a crossover module 54, a mutation module 55, a fitness evaluation module 56, and a discriminator 57.

The initial population generation module 52 creates p initial parent strings of abundance ($a_1, a_2, \ldots, a_p$). A random number generator can be utilized to produce uniform numbers between 0 and 1, which guarantees that the values of the elements of the abundance vector are between 0 and 1. In order to make the total abundance of each parent equal to 1.0, each element of the abundances vector of each parent is normalized by the sum, i.e., $$a_{ij} \Big/ \sum_{i=1}^{m} a_{ij} \quad j = 1, \ \ldots, p.$$

The generated p parents are sent to the selection and coupling module 53.

The cost function module 51 plays a role to evaluate the population of the abundance. The cost function module 51 can be mean square error (MSE). The selection and coupling module 53 receives the population of abundance and selects two best parents based on the cost function module 51, i.e. a minimum value of the MSE. The value of the MSE for any parent in the current population is calculated by $$\sum_{i=1}^{l}\left(r_i - \sum_{j=1}^{m}(s_{ij} \cdot a_{jk})\right)^2 \Big/ l,$$

where l is the total band number, m is the total number of endmembers, s is the endmember signature, a is the abundance, and k represents the $k^{th}$ parent. The selected two best parents are sent to the crossover module 54 to perform crossover operation.

In the crossover module 54, first, a split point is chosen for both of the two best parents. If $a_{i1}$ (i=1,2, . . . m) represents the first best parent and $a_{i2}$ (i=1,2, . . . m) is the second best parent, after crossover, the new string will be $$b_i \begin{cases} a_{i1} & (i = 1, 2, \ \ldots \ m_{sp}) \\ a_{i2} & (i = m_{sp} + 1, m_{sp} + 2, \ \ldots \ m) \end{cases}$$

where $m_{sp}$ represents the location of the split point. As an example, let the two best parents have the following abundance values:

| | | | | | |
|---|---|---|---|---|---|
| 0.21 | 0.08 | 0.41 | 0.01 | 0.06 | 0.23. |
| 0.42 | 0.01 | 0.04 | 0.11 | 0.31 | 0.11. |

If the split point is located between the second and the third elements, after the crossover, two new strings will be created. They are:

| | | | | | |
|---|---|---|---|---|---|
| 0.21 | 0.08 | 0.04 | 0.11 | 0.31 | 0.11. |
| 0.42 | 0.01 | 0.41 | 0.01 | 0.06 | 0.23. |

After crossover, the new strings should be normalized to make the sum of the abundances equal to 1. If the new strings are better than any parent in the old population, the new strings will replace the old ones and enter the new population. Otherwise, the parent strings will be inherited.

After crossover operation, the survived strings are sent to the mutation module 55, where each parent string mutates into a child by generating −10% to 10% random numbers to add to the elements for each parent. The string is normalized and then sent to the fitness evaluation module 56. The fitness evaluation module 56 calculates the MSE for each new string. If the value of MSE of the new string is better than the parent's, the new string will go into the new population as the child string. Otherwise, the parent will be kept as part of the new population.

For a specified problem, a different cost function (fitness) will be determined to evaluate the population. In many problems, the objective is more naturally stated as the minimization of some cost function J(x) rather than the maximization of some utility or profit function u(x). Even if the problem is naturally stated in a maximization of form, this doesn't guarantee that the utility function will be nonnegative for all values of x as it is required in the fitness function. Therefore, it is necessary to change the cost function into a fitness function. The duality of cost minimization and profit maximization is well known. In normal research work, the simple way to transform a minimization problem to a maximization problem is to multiply the cost function by a minus one. However, in evolutionary algorithm work, this operation is insufficient because the measure thus obtained is not guaranteed to be nonnegative in all instances. So with evolutionary algorithm the following cost-to-fitness transformation is used $$f(x) = \begin{cases} C_{\max} - J(x) & J(x) < C_{\max} \\ 0 & \text{otherwise} \end{cases}$$

There are a variety of ways to choose the coefficient $C_{max}$, $C_{max}$ may be taken as an input coefficient. For a control problem, the performance measures (cost function J(x)) usually are (1) Average least squares error for all members of the population;

(2) Least squares error for the fittest member of the population;

(3) Normalized variance of each of the physical parameters across the whole population.

All of these performance indicators can be used to decide when the optimization should be terminated. This operation is performed by Discriminator 57, as shown in FIG. 4.

Figure 5:
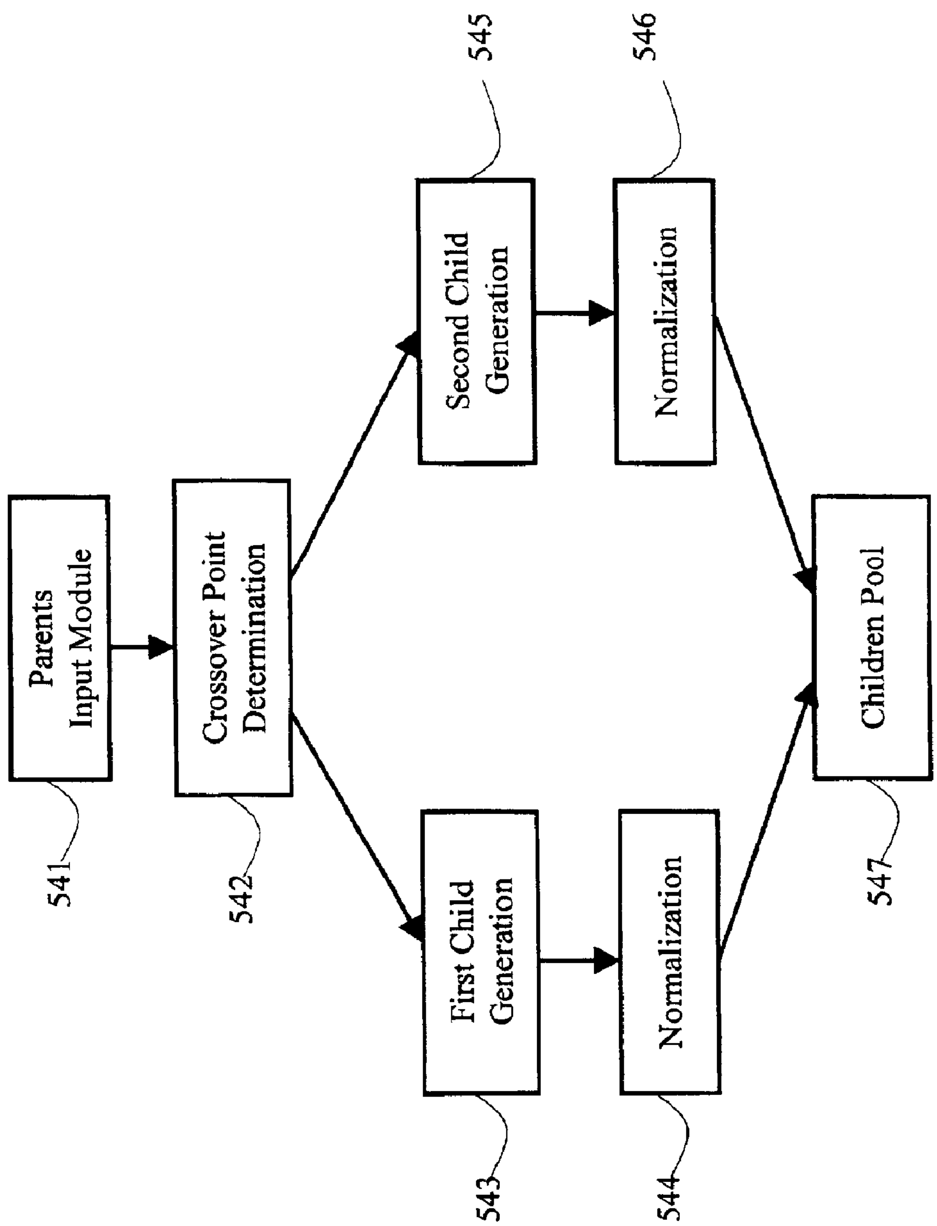
FIG. 5 is a block diagram illustrating the implementation of a crossover module of the evolutionary algorithm.

Referring to FIG. 5, the crossover module 54 includes a parent input module 541, a crossover point determination 542, a first child generation 543, a normalization 544, a second child generation 545, a normalization 546, and a child pool 547.

The parent input module 541 takes the two best parents from the selection and coupling module 53. These two parents will exchange their string parts after determination of a crossover point. The crossover point determination 542 randomly picks up a number between 1 and m−1 as the crossover point, where m represents the total number of endmembers.

The first child generation 543 combines the first string part of the first parent and the second string part of the second parent to form the first child. The first child is normalized in normalization 544 that the sum of the abundance equal to 1. The normalized first child is put into the child pool 547.

The second child generation 545 combines the first string part of the second parent and the second string part of the first parent to form the second child. The second child is normalized in normalization 546 that the sum of the abundance equal to 1. The normalized second child is put into the child pool 547.

Figure 6:
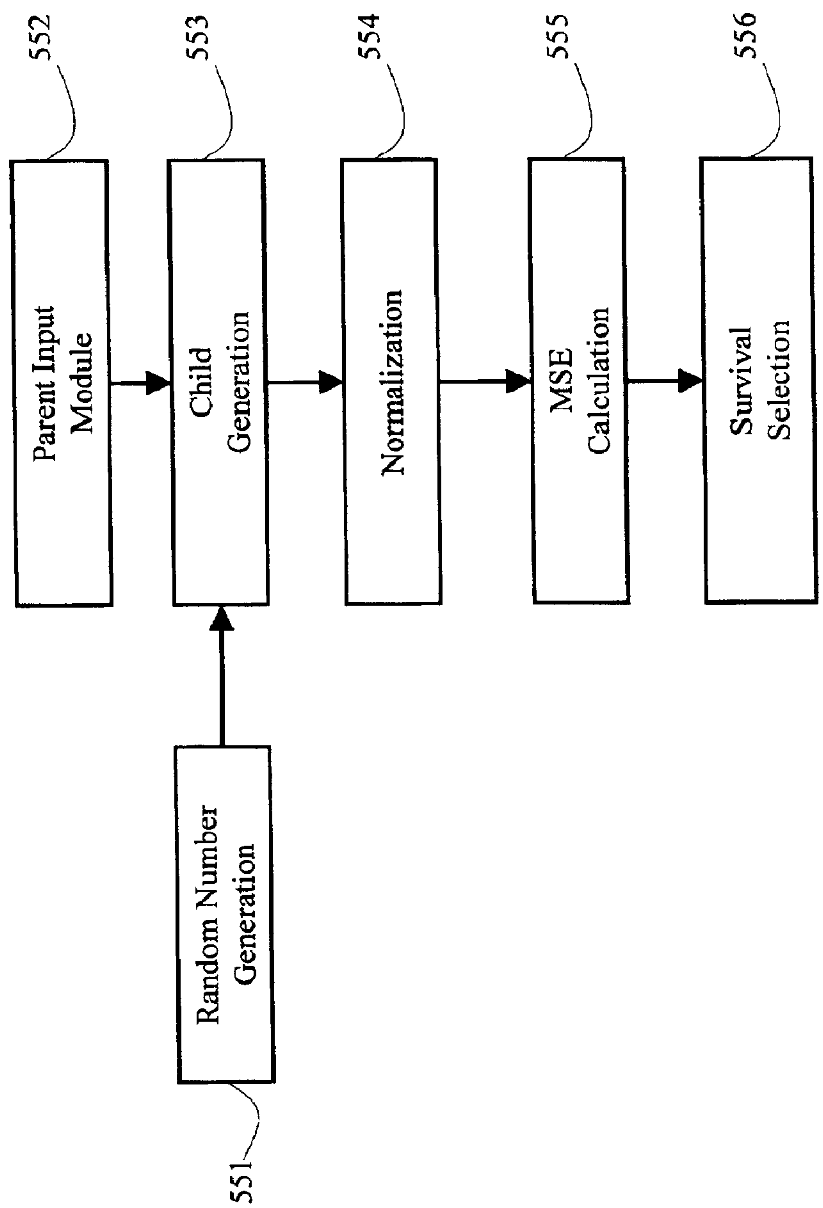
FIG. 6 is a block diagram illustrating the implementation of the mutation module of the evolutionary algorithm.

Referring to FIG. 6, the mutation module 55 comprises a random number generation 551, a parent input module 552, a child generation 553, a normalization 554, a MSE calculation 555, and a survival selection 556.

The parent input module 552 takes the survived strings from crossover module 54. The random number generation 551 generates random numbers that, in child generation 553, are added to the elements of each parent from parent input module 552. The mutated child from child generation 553 is normalized in normalization 554.

The MSE calculation 555 computes the mean square error corresponding to each string, and the survived child is finally chosen in survival selection 556.

What is claimed is:

1. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated, to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination criteria is defined as a number of total evolution generations that, when said evolutionary estimator iterates to said number of total evolution generations, one of said abundance strings with highest fitness is selected as a solution and said evolutionary algorithm quit evolution, wherein a corresponding abundance estimation vector thereof is said abundance estimate of said selected trail pixel;

(e-7) sending said new population of said abundance strings to said selection and coupling module; and (e-8) repeating the steps (e-2), (e-3), (e-4), (e-5), (e-6) and (e-7).

2. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance, strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated, to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination is performed by evaluating a difference between said abundance strings, wherein when said different between said abundance string is less than a preset value, then said evolutionary estimator quit evolution, wherein one of said abundance strings with highest fitness is chosen as a solution, a corresponding abundance estimation vector thereof is said abundance estimate of said selected trail pixel;

(e-7) sending said new population of said abundance strings to said selection and coupling module; and (e-8) repeating the steps (e-2), (e-3), (e-4), (e-5), (e-6) and (e-7).

3. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination criteria is defined as a number of total evolution generations that, when said evolutionary estimator iterates to said number of total evolution generations, one of said abundance strings with highest fitness is selected as a solution and said evolutionary algorithm quit evolution, wherein a corresponding abundance estimation vector thereof is said abundance estimate of said selected trail pixel;

(e-7) sending said new population of said abundance strings to said selection and coupling module; and (e-8) repeating the steps (e-2), (e-3), (e-4), (e-5), (e-6) and (e-7).

4. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated, to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination is performed by evaluating a difference between said abundance strings, wherein when said different between said abundance string is less than a preset value, then said evolutionary estimator quit evolution, wherein one of said abundance strings with highest fitness is chosen as a solution, a corresponding abundance estimation vector thereof is said abundance estimate of said selected trail pixel;

(e-7) sending said new population of said abundance strings to said selection and coupling module; and (e-8) repeating the steps (e-2), (e-3), (e-4), (e-5), (e-6) and (e-7).

5. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel, wherein said neighboring pixels further includes a left-top corner pixel of said selected trail pixel, a right-top corner pixel of said selected trail pixel, a right-bottom corner pixel of said selected trail pixel, and a left-bottom corner pixel of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated, to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination criteria is defined as a number of total evolution generations that, when said evolutionary estimator iterates to said number of total evolution generations, one of said abundance strings with highest fitness is selected as a solution and said evolutionary algorithm quit evolution, wherein a corresponding abundance estimation vector thereof is said abundance estimate of said selected trait pixel;

(e-7) sending said new population of said abundance strings to said selection and coupling module; and (e-8) repeating the steps (e-2), (e-3), (e-4), (e-5), (e-6) and (e-7).

6. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel, wherein said neighboring pixels further includes a left-top corner pixel of said selected trail pixel, a right-top corner pixel of said selected trail pixel, a right-bottom corner pixel of said selected trail pixel, and a left-bottom corner pixel of said selected trail pixel; and (e) applying an abundance estimator to perform an abundance estimation using measurement data corresponding to said selected trail pixel and said set of reference signatures, wherein said abundance estimator is an evolutionary estimator, wherein the step (c) further comprises the steps of:

(e-1) generating randomly an initial population of abundance strings by an initial population generation module that represents said abundance estimation related to said selected trail pixel of said hyperspectral image cube, wherein said abundance strings are normalized that the sum of said abundance estimation equal to 1;

(e-2) performing selection and coupling in a selection and coupling module based on a cost function by a selection and coupling module, wherein said cost function is mean square error and a criteria for best abundance string is an abundance string with minimum mean square error, wherein said abundance strings with large fitness have a large number of copies in a next generation, and once said abundance strings are selected for possible use in said next generation, said abundance strings wait an action of two other operators, namely a crossover and a mutation;

(e-3) generating a population of offspring by exchanging tails and heads of said abundance strings in a crossover module, wherein said crossover provides a mechanism for said abundance strings to mix and match desirable qualities thereof through a random process comprising the steps of selecting and coupling two said abundance strings by said selection and coupling module, selecting a position along the two strings uniformly at random, exchanging all characters following a crossing sit, and normalizing new reproduced abundance strings;

(e-4) adding numbers, which are randomly generated, to each element of each number of said population of offspring in a mutation module;

(e-5) computing a fitness value on each said abundance estimation by a fitness evaluation module, wherein a cost function takes said abundance string and returns a value, wherein said value of said cost function is then mapped into a fitness value so as to fit into said evolutionary estimator, wherein said fitness value is reward based on a performance of a possible solution represented by said abundance string, wherein said fitness values are sent to a discriminator;

(e-6) performing a discrimination to determine whether to stop evolution or not, wherein a discrimination is performed by evaluating a difference between said abundance strings, wherein when said different between said abundance string is less than a preset value, then said evolutionary estimator quit evolution, wherein one of said abundance strings with highest fitness is chosen as a solution, a corresponding abundance estimation vector thereof is said abundance estimate of said selected trail pixel;

(e-7) sending said new population of said abundance strings to said selection and coupling module; and (e-8) repeating the steps (e-2), (e-3), (e-4), (e-5), (e-6) and (e-7).

7. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel; and (e) applying an abundance estimator to perform an abundance estimation using measurement data corresponding to said selected trail pixel and said set of reference signatures, wherein said abundance estimator is an evolutionary estimator which comprises a cost function module, an initial population generation module, a selection and coupling module, a crossover module, a mutation module, a fitness evaluation module, and a discriminator, wherein said initial population generation module creates a predetermined number of initial parent strings of an abundance, wherein a random number generator is utilized to produce uniform numbers between 0 and 1, which guarantees that values of elements of an abundance vector are between 0 and 1 and, in order to make a total abundance of each of said parent strings of abundance equal to 1.0, each of said elements of said abundance vector of each said parent string is normalized, wherein said generated parent strings of abundance are sent to said selection and coupling module;

said cost function module, which is a mean square error, for evaluating a population of said abundance;

said selection and coupling module receives said population of said abundance and selects two of said parent strings based on said cost function module, that is a minimum value of said mean square error, wherein said two selected parent strings are sent to said crossover module to perform crossover operation;

said crossover module chooses a split point for both of said selected parent strings, wherein when said split point is located between a second and third elements, after said crossover, two new strings are created, wherein after crossover, said new strings are normalized to make a sum of said abundance equal to 1, wherein when said new strings are better than any of said parent strings in said population, said new strings replace said two selected parent strings to form survived strings and enter a new population; otherwise, said parent strings are inherited to form said survived strings, wherein said survived strings are sent to said mutation modules;

said mutation module mutates each said parent string into a child string by generating −10% to 10% random numbers to add to said elements for each of said parent strings, wherein each of said survived strings is normalized and then sent to said fitness evaluation module;

said fitness evaluation module calculates said mean square error for each of said new strings, wherein when a value of mean square error of said new string is better than that of said respective parent string, said new string goes into said new population as said child string; otherwise, said parent string is kept as part of said new population; and said discriminator processes performance measures includes average least squares error for all members of each said population, least squares error for a fittest member of each said population, and normalized variance of each of physical parameters across a whole population.

8. A method for target detection and identification, as recited in claim 7, wherein said crossover module includes a parent input module, a crossover point determination, a first child generation, a normalization, a second child generation, a normalization, and a child pool, wherein said parent input module takes said two parent strings from said selection and coupling module, wherein said two parent strings exchange string parts thereof after determination of a crossover point;

said crossover point determination randomly picks up a number between 1 and a total number of endmembers minus 1 as said crossover point;

said first child generation combines a first string part of a first parent string of said two parent strings and a second string part of a second string of said two parent strings to form a first child string which is normalized in said normalization that said sum of said abundance equal to 1 and then said normalized first child string is put into said child pool;

said second child generation combines a first string part of said second parent string and a second string part of said first parent to form a second child string which is normalized in said normalization that said sum of said abundance equal to 1 and then said normalized second child string is put into said child pool.

9. A method for target detection and identification, as recited in claim 8, wherein said mutation module comprises a random number generation, a parent input module, a child generation, a normalization, a mean square error calculation, and a survival selection, wherein said parent input module takes said survived strings from said crossover module, wherein said random number generation generates random numbers that, in said child generation, are added to elements of each of said parent strings from said parent input module, and said mutated child from child generation is normalized in said normalization, wherein said mean square error calculation computes said mean square error corresponding to each of said strings, and said survived child is finally chosen in said survival selection.

10. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel; and (e) applying an abundance estimator to perform an abundance estimation using measurement data corresponding to said selected trail pixel and said set of reference signatures, wherein said abundance estimator is an evolutionary estimator which comprises a cost function module, an initial population generation module, a selection and coupling module, a crossover module, a mutation module, a fitness evaluation module, and a discriminator, wherein said initial population generation module creates a predetermined number of initial parent strings of an abundance, wherein a random number generator is utilized to produce uniform numbers between 0 and 1, which guarantees that values of elements of an abundance vector are between 0 and 1 and, in order to make a total abundance of each of said parent strings of abundance equal to 1.0, each of said elements of said abundance vector of each said parent string is normalized, wherein said generated parent strings of abundance are sent to said selection and coupling module;

said cost function module, which is a mean square error, for evaluating a population of said abundance;

said selection and coupling module receives said population of said abundance and selects two of said parent strings based on said cost function module, that is a minimum value of said mean square error, wherein said two selected parent strings are sent to said crossover module to perform crossover operation;

said crossover module chooses a split point for both of said selected parent strings, wherein when said split point is located between a second and third elements, after said crossover, two new strings are created, wherein after crossover, said new strings are normalized to make a sum of said abundance equal to 1, wherein when said new strings are better than any of said parent strings in said population, said new strings replace said two selected parent strings to form survived strings and enter a new population; otherwise, said parent strings are inherited to form said survived strings, wherein said survived strings are sent to said mutation modules;

said mutation module mutates each said parent string into a child string by generating −10% to 10% random numbers to add to said elements for each of said parent strings, wherein each of said survived strings is normalized and then sent to said fitness evaluation module;

said fitness evaluation module calculates said mean square error for each of said new strings, wherein when a value of mean square error of said new string is better than that of said respective parent string, said new string goes into said new population as said child string; otherwise, said parent string is kept as part of said new population; and said discriminator processes performance measures includes average least squares error for all members of each said population, least squares error for a fittest member of each said population, and normalized variance of each of physical parameters across a whole population.

11. A method for target detection and identification, as recited in claim 10, wherein said crossover module includes a parent input module, a crossover point determination, a first child generation, a normalization, a second child generation, a normalization, and a child pool, wherein said parent input module takes said two parent strings from said selection and coupling module, wherein said two parent strings exchange string parts thereof after determination of a crossover point;

said crossover point determination randomly picks up a number between 1 and a total number of endmembers minus 1 as said crossover point;

said first child generation combines a first string part of a first parent string of said two parent strings and a second string part of a second string of said two parent strings to form a first child string which is normalized in said normalization that said sum of said abundance equal to 1 and then said normalized first child string is put into said child pool;

said second child generation combines a first string part of said second parent string and a second string part of said first parent to form a second child string which is normalized in said normalization that said sum of said abundance equal to 1 and then said normalized second child string is put into said child pool.

12. A method for target detection and identification, as recited in claim 11, wherein said mutation module comprises a random number generation, a parent input module, a child generation, a normalization, a mean square error calculation, and a survival selection, wherein said parent input module takes said survived strings from said crossover module, wherein said random number generation generates random numbers that, in said child generation, are added to elements of each of said parent strings from said parent input module, and said mutated child from child generation is normalized in said normalization, wherein said mean square error calculation computes said mean square error corresponding to each of said strings, and said survived child is finally chosen in said survival selection.

13. A method for target detection and identification, comprising the steps of:

(a) receiving a hyperspectral image cube, wherein said hyperspectral image cube represents a scene in terms of wavelength and spatial position;

(b) selecting a material of interest from a target database, wherein said material of interest represents a target for a target detection and identification;

(c) selecting a trial pixel having a predetermined location in said hyperspectral image cube, wherein said target detection and identification is preformed on said trail pixel;

(d) building a set of reference signatures which comprises a signature of said selected material of interest and a plurality of signatures of a plurality of neighboring pixels of said selected trail pixel, wherein said neighboring pixels includes a left pixel of said selected trail pixel, a top pixel of said selected trail pixel, a right pixel of said selected trail pixel, and a bottom pixel of said selected trail pixel, wherein said neighboring pixels further includes a left-top corner pixel of said selected trail pixel, a right-top corner pixel of said selected trail pixel, a right-bottom corner pixel of said selected trail pixel, and a left-bottom corner pixel of said selected trail pixel; and (e) applying an abundance estimator to perform an abundance estimation using measurement data corresponding to said selected trail pixel and said set of reference signatures, wherein said abundance estimator is an evolutionary estimator which comprises a cost function module, an initial population generation module, a selection and coupling module, a crossover module, a mutation module, a fitness evaluation module, and a discriminator, wherein said initial population generation module creates a predetermined number of initial parent strings of an abundance, wherein a random number generator is utilized to produce uniform numbers between 0 and 1, which guarantees that values of elements of an abundance vector are between 0 and 1 and, in order to make a total abundance of each of said parent strings of abundance equal to 1.0, each of said elements of said abundance vector of each said parent string is normalized, wherein said generated parent strings of abundance are sent to said selection and coupling module;

said cost function module, which is a mean square error, for evaluating a population of said abundance;

said selection and coupling module receives said population of said abundance and selects two of said parent strings based on said cost function module, that is a minimum value of said mean square error, wherein said two selected parent strings are sent to said crossover module to perform crossover operation;

said crossover module chooses a split point for both of said selected parent strings, wherein when said split point is located between a second and third elements, after said crossover, two new strings are created, wherein after crossover, said new strings are normalized to make a sum of said abundance equal to 1, wherein when said new strings are better than any of said parent strings in said population, said new strings replace said two selected parent strings to form survived strings and enter a new population; otherwise, said parent strings are inherited to form said survived strings, wherein said survived strings are sent to said mutation modules;

said mutation module mutates each said parent string into a child string by generating −10% to 10% random numbers to add to said elements for each of said parent strings, wherein each of said survived strings is normalized and then sent to said fitness evaluation module;

said fitness evaluation module calculates said mean square error for each of said new strings, wherein when a value of mean square error of said new string is better than that of said respective parent string, said new string goes into said new population as said child string; otherwise, said parent string is kept as part of said new population; and said discriminator processes performance measures includes average least squares error for all members of each said population, least squares error for a fittest member of each said population, and normalized variance of each of physical parameters across a whole population.

14. A method for target detection and identification, as recited in claim 13, wherein said crossover module includes a parent input module, a crossover point determination, a first child generation, a normalization, a second child generation, a normalization, and a child pool, wherein said parent input module takes said two parent strings from said selection and coupling module, wherein said two parent strings exchange string parts thereof after determination of a crossover point;

said crossover point determination randomly picks up a number between 1 and a total number of endmembers minus 1 as said crossover point;

said first child generation combines a first string part of a first parent string of said two parent strings and a second string part of a second string of said two parent strings to form a first child string which is normalized in said normalization that said sum of said abundance equal to 1 and then said normalized first child string is put into said child pool;

said second child generation combines a first string part of said second parent string and a second string part of said first parent to form a second child string which is normalized in said normalization that said sum of said abundance equal to 1 and then said normalized second child string is put into said child pool.

15. A method for target detection and identification, as recited in claim 14, wherein said mutation module comprises a random number generation, a parent input module, a child generation, a normalization, a mean square error calculation, and a survival selection, wherein said parent input module takes said survived strings from said crossover module, wherein said random number generation generates random numbers that, in said child generation, are added to elements of each of said parent strings from said parent input module, and said mutated child from child generation is normalized in said normalization, wherein said mean square error calculation computes said mean square error corresponding to each of said strings, and said survived child is finally chosen in said survival selection.

* * * * *

UNITED STATES PATENT AND TRADEMARK OFFICE

CERTIFICATE OF CORRECTION

PATENT NO. : 6,940,999 B2
DATED : September 6, 2005
INVENTOR(S) : Lin

It is certified that error appears in the above-identified patent and that said Letters Patent is hereby corrected as shown below:

Column 1,
Line 10, "FIELD OF THE PRESENT INVENTION", please add the following:
-- This invention was made with Government support under Contract F30602-99-C-0108 awarded by the Air Force. The Government has certain rights in this invention. --.

Signed and Sealed this

Eighth Day of November, 2005

JON W. DUDAS
*Director of the United States Patent and Trademark Office*